United States Patent [19]

Mariel

[11] Patent Number: 5,613,325
[45] Date of Patent: Mar. 25, 1997

[54] MOTOR VEHICLE GLAZING UNITS

[75] Inventor: James G. Mariel, Mishawaka, Ind.

[73] Assignee: Excel Industries, Inc., Elkhart, Ind.

[21] Appl. No.: 577,224

[22] Filed: Dec. 22, 1995

[51] Int. Cl.⁶ .......................... E05D 15/06; E05F 11/38
[52] U.S. Cl. .................. 49/404; 49/374; 49/440; 49/506
[58] Field of Search .................. 49/440, 441, 404, 49/374, 506

[56] References Cited

U.S. PATENT DOCUMENTS

| | | | |
|---|---|---|---|
| 4,490,942 | 1/1985 | Arnheim et al. | 49/440 X |
| 4,571,886 | 2/1986 | Shiraishi | 49/374 |
| 4,628,637 | 12/1986 | Okada et al. | 49/440 X |
| 4,823,511 | 4/1989 | Herliczek et al. | 49/404 |
| 4,969,293 | 11/1990 | Guillon | 49/441 |
| 5,013,379 | 5/1991 | Brooks et al. | 49/441 X |
| 5,398,452 | 3/1995 | Schilde et al. | 49/404 X |

OTHER PUBLICATIONS

SAE Technical Paper Series—950049—*Occupant Retention Glazing for Automotive Sidelites* James R. Moran, James Mariel and Dean L. Kavanagh, International Congress and Exposition, Detroit, Michigan, Feb. 27–Mar. 2, 1995.

*Primary Examiner*—Philip C. Kannan
*Attorney, Agent, or Firm*—Banner & Witcoff, Ltd.

[57] ABSTRACT

A motor vehicle glazing unit has generally U-shaped frame channels open toward each other in substantially fixed position. A transparent glazing pane is moveably mounted in the frame channels, having at least one non-frangible pane member, such that the deformation of the glazing pane provides good energy absorption. Edge flanges extend along the peripheral edge of the glazing pane, extending laterally beyond the peripheral edge to a distal portion. Typically, a pair of edge flanges extends vertically along opposite vertical edges of a vertically moveable glazing pane. The distal portion of the edge flange is received in the corresponding frame channel. Edge flange retainers are provided in substantially fixed position relative the frame channels. The edge flange retainers each have a structural member oriented along the corresponding frame channel to capture the distal portion of the edge flange in the frame channel during deformation of the glazing pane. The edge flange retainers hold the glazing pane in the window frame as it absorbs energy during outward, and optionally inward, deformation. Glazing panes preassembled with edge flanges can be readily assembled into motor vehicle window frames using current assembly techniques, after which the edge flange retainers are installed to cooperate with the deformation characteristics of the glazing pane to provide good energy management characteristics.

11 Claims, 4 Drawing Sheets

MOTOR VEHICLE GLAZING UNITS

INTRODUCTION

The present invention is directed to a motor vehicle glazing unit having a moveably mounted glazing pane with good design-for-assembly qualities suitable for motor vehicle assembly line operations, and providing good glazing pane retention and energy containment.

BACKGROUND

Body panels of a motor vehicle, including the vehicle's glazing units, must satisfy numerous design criteria. Among the most significant criteria arc suitability for assembly, especially initial assembly in a commercial volume assembly line and repair or retrofit assembly. Another significant criterion is energy containment, with controlled deformation of body panels generally being relied upon for significant contribution in this regard. The polyvinyl butyral (PVB) laminate layer in motor vehicle windshields, for example, provides good energy absorption in the course of fracture and deformation. Motor vehicle body panels also must meet aesthetic design criteria, providing a smooth and flush outer surface. This has been a long-term design objective both for aesthetic reasons and to provide functional improvements, such as improved fuel economy by reduced aerodynamic drag.

Motor vehicle glazing units having a moveably mounted glazing pane, most notably the side windows of a vehicle, have generally employed a tempered glass pane sliding up and down in a pair of U-shaped run channels. Such designs, while being well suited to modern motor vehicle assembly operations, can compromise the aesthetic qualities of the vehicle design due to their recessed or lack of flushness with the surrounding window frame. In addition, it would be desirable to increase the energy absorption of such glazing units.

Bilaminate and trilaminate glazings have been suggested for use as moveably mounted panes in motor vehicles. In U.S. Pat. No. 4,823,511 to Herliczek et al, laminated glazing panes are suggested having a three-sided edge support molded along the vertical edges. The edge support is three-sided in the sense that it wraps around the edge of the glass pane, contacting the outboard surface, the peripheral side edge and the inboard surface of the pane. The edge support of the Herliczek patent extends into run channels in the window frame and is captured therein to provide improved retention strength. The cross-sectional configuration of the edge support may, for example, be T-shaped, L-shaped or rounded, in each case being received into a correspondingly configured run channel in the window frame. Such three-sided edge support designs are disadvantageous in that they prevent a smooth flush window appearance. Specifically, the portion of the edge support which wraps around the outboard surface of the glazing pane presents an undesirable interruption of the otherwise smooth glazing pane surface. In addition, the edge support presents significant assembly disadvantages. Specifically, the T-shaped and L-shaped configurations must be top loaded or bottom loaded into the vertical run channels. While the rounded configurations having no T-shaped or L-shaped projections may be more suitable for assembly operations, being received in some cases laterally into the run channels, they may for that reason also provide less improvement in window pane retention. Energy absorption by fracture and deformation of a laminated glazing pane is dependent, of course, on suitable edge retention.

It is an object of the present invention to provide motor vehicle glazing units having moveably mounted glazing panes which provide good energy containment properties. It is a further object of at least certain preferred embodiments of the invention, to provide motor vehicle glazing units having such energy containment properties while still providing good aesthetic and design-for-assembly characteristics. Additional objects and advantages of the invention and/or of at least certain preferred embodiments will be readily understood from the following disclosure and detailed description.

SUMMARY

In accordance with a first aspect, a glazing pane suitable for motor vehicle glazing units comprises a penetration resistant pane, e.g., a laminate of a tempered or other frangible pane with at least one film or layer of plastically or elastomerically deformable material, such as a plastic film, laminated thereto. A glazing pane frame comprising edge flanges optionally being separate or unitary portions of a peripheral frame element, preferably a one-sided or two-sided integrally molded frame, extends along at least a portion of the periphery of the glazing pane laminate. The glazing pane frame extends laterally, that is, in the plane of the glazing pane or in a parallel pane, beyond the periphery of the glazing pane.

In accordance with a first aspect, a motor vehicle glazing unit has first and second generally U-shaped frame channels open toward each other in substantially fixed positions. A transparent glazing pane is moveably mounted in the frame channels. The glazing pane includes at least a non-frangible pane and, typically, also has a tempered glass or other frangible pane laminated to the non-frangible pane. The glazing pane is capable of undergoing plastic or elastomeric deformation for energy absorption purposes. Edge flanges fixed along the periphery of the glazing pane extend laterally outward beyond the peripheral edge into the frame channels. More specifically, a first portion of each such edge flange is bonded to the glazing pane in either a three-surface or, more preferably, a two-surface or one-surface bonding configuration. The edge flanges extend laterally outward from such first portion to a distal portion which is slidably received in a corresponding one of the aforesaid frame channels. In accordance with a further significant aspect, edge flange retainers are provided in substantially fixed position relative the frame channels. The edge flange retainers comprise a generally U-shaped structural member. The edge flange retainers are oriented such that they are open away from each other, serving to capture the distal portion of the corresponding edge flange in the corresponding frame channel.

As noted above, the glazing pane is a non-frangible material or is a laminate of one or more frangible panes, such as tempered glass, together with one or more laminate members which undergo plastic or elastomeric deformation. Thus, the glazing pane will advantageously absorb energy in the course of undergoing destructive deformation. To take good advantage of such energy absorption properties, however, the glazing pane must be retained in the window opening during such energy absorption process. In the motor vehicle glazing units disclosed here, the glazing pane is retained in the window opening as it is outwardly deformed, by interaction of the distal portion of the edge flange with the above-disclosed edge flange retainer associated with each of the frame channels. It will be recognized as a significant advance in this area of technology that the distal portions of the edge flanges can have excellent design-for-assembly characteristics in that the glazing units with the edge flanges attached are readily assembly into their corresponding frame channels, such that current motor vehicle glazing unit assembly techniques can be employed in their manufacture. The edge flange retainers can then be assembled and fixed in position to capture the distal portion of the edge flange within the frame channel.

It will be understood from this disclosure and the following detailed description of certain preferred embodiments that the distal portions of the edge flanges of the glazing pane are captured by the edge flange retainers in the sense that the retainers would interfere with the distal portions escaping the frame channel in the event of outward deformation of the glazing pane. Outward deformation is intended here to refer to at least a portion of the main area of the glazing pane being forced outwardly of the vehicle, typically with irreversible destruction of the glazing pane or at least of one or more laminate elements of the pane. Consistent with good energy absorption principals, the glazing pane typically would not be designed to hold its position against force above a certain level and the edge flange retainer correspondingly would not be designed in most applications of the invention to hold the distal portion of the edge flange in the frame channel above a specified force level. Thus, the edge flange retainer captures the distal portion of the edge flange in the sense of preventing or at least interfering with such distal portion escaping the frame channel while the glazing pane undergoes energy absorbing deformation to a certain extent, after which the glazing pane may by design escape the frame channel.

It is another significant advantage that the motor vehicle glazing units disclosed here can be designed to provide a substantially flush appearance at the exterior surface of the vehicle. The edge flange, as noted above, may have a one surface or two surface attachment configuration to the glazing pane, leaving the exterior surface of the glazing pane (meaning at least that portion of the pane which extends into the window opening during normal operation of the glazing unit) free and clear. The outboard surface of the glazing pane may, therefore, be positioned in a plane substantially flush with that of adjacent body panels of the motor vehicle. The motor vehicle glazing units disclosed here, particularly in preferred embodiments, can provide such aesthetic advantages together with the combined ease of assembly and energy absorption advantages discussed above. It will also be apparent from this disclosure that these advantages can be achieved also in applications involving retrofitting existing motor vehicle glazing unit designs. Additional features and advantages will be more readily apparent from the following detailed discussion of certain preferred embodiments.

BRIEF DESCRIPTION OF THE DRAWINGS

The following detailed discussion of certain preferred embodiments will refer to the appended drawings wherein.

It should be understood that glazing units in accordance with the present invention may have dimensions and configurations differing from those of the preferred embodiments illustrated in the appended drawings. The relative size and configuration of the various components and features would be determined in large part by the particular application for which the glazing unit is intended. It will be well within the ability of those skilled in the art, given the benefit of the above disclosure and the following detailed description of certain preferred embodiments, to select suitable component configurations, materials, production techniques and the like, to meet the needs of such particular applications. It also should be understood that the dimensions of certain features or aspects shown in the appended drawings have been enlarged or otherwise modified for clarity of illustration.

DETAILED DESCRIPTION OF CERTAIN PREFERRED EMBODIMENTS

It will be understood by those skilled in the art in view of the present disclosure, that the moveably mounted glazing pane of the motor vehicle glazing units disclosed here may be vertically moveable, horizontally moveable, etc. Similarly, it will be understood that window movement may be controlled by any of various known window operating mechanisms, including both manual and electric operating mechanisms. To avoid undue redundancy, the following discussion will focus primarily on motor vehicle glazing units having vertically moveable glazing panes, such as those in widespread commercial use as openable windows in motor vehicle doors.

Figure 1:
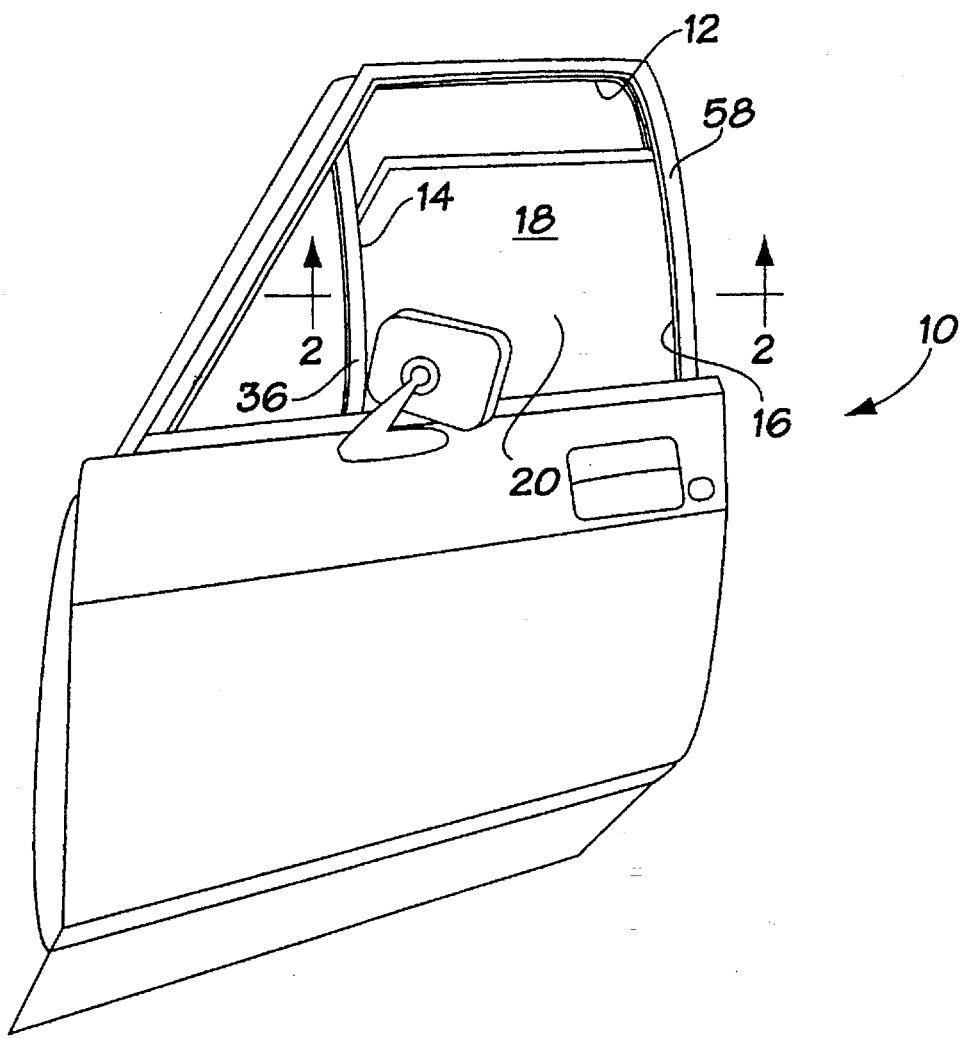
FIG. 1 is a schematic side elevation view of a motor vehicle door having a glazing unit in accordance with a first preferred embodiment.
Figure 2:
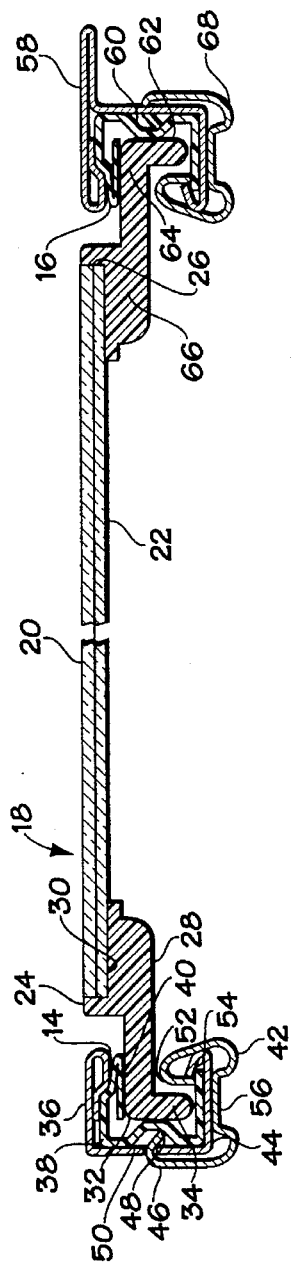
FIG. 2 is a section view of the embodiment of FIG. 1, taken through line 2—2 of FIG. 1.

One preferred embodiment of a motor vehicle glazing unit is illustrated in FIGS. 1 and 2. A portion of a motor vehicle body structure, specifically, a vehicle door 10, is seen to have a window opening 12 defined in part by vertically extending structural frame channels. Specifically, a generally U-shaped front frame channel 14 and a generally U-shaped rear frame channel 16 are open toward each other in substantially fixed position in the vehicle door 10. A transparent glazing pane 18 is a bilaminate, comprising a tempered glass pane 20 on the outboard side of the door, that is, on the side facing outward of the passenger compartment, and a non-frangible, preferably plastic, pane 22 on the inboard side. Glazing pane 18 has a peripheral edge, including a forward or front vertical portion 24 and a rear vertical portion 26. Even though the outboard pane is tempered glass which would fracture in response to a sufficient deforming force, glazing pane 18 would provide good energy absorption through the plastic or elastomeric deformation of inboard non-frangible pane 22. Suitable materials are commercially available and known to those skilled in the art for inboard pane 22, including, for example, a multifilm layer having PVB immediately on the glass, a urethane film next, and an exposed anti-scudd film.

The glazing pane is not itself directly received into the frame channels 14, 16. Rather, edge flanges attached along the peripheral edge of the glazing pane extend laterally into the frame channels. More specifically, a first or forward edge flange 28 is seen to have two-surface bonding to glazing pane 18. That is, it forms an adhesive bond along forward peripheral edge 24 and the adjacent peripheral portion 30 of the inboard surface of the glazing pane. Edge flange 28 extends from the glazing pane to a distal portion 32 which is positioned in the U-shaped frame channel 14. It can be seen that distal portion 32 of the edge flange is dog-legged, that is, it is configured to have an angled end flange 34, discussed further below.

The U-shaped frame channel 14 is defined primarily by roll-formed sheet metal 36 which is structurally integrated into vehicle door 10. The frame channel 14 is further defined by a weather seal 38, which preferably is structurally or semi-structurally integrated with sheet metal 36. Weather seal 38 is seen to be generally U-shaped to further define the frame channel 14, including flexible seal portion 40 which is elastomerically biased into surface contact with the distal portion 32 of edge flange 28. Weather seal 38 preferably has a smooth or flocked inside surface, etc., to provide a smooth, low friction sliding interface with the edge flange 28, whereby good window operation and good noise and weather sealing are accomplished.

The glazing unit at forward channel 14 further comprises a forward retention device 42. The retention device, also referred to here as an edge flange retainer, is in substantially fixed position relative the U-shaped frame channel 14. It is seen to be generally U-shaped, that is, it has a generally concave cross-sectional configuration with a portion of the frame channel structure in the concavity. More specifically, inboard portion 44 of the frame channel is seen to be received in the retainer. The retainer captures the distal portion 32 of the edge flange 28 in the frame channel 14. Edge flange retainer 42 captures the edge flange 28 meaning, first, that the retainer is a structural element, and second, that it is so positioned and configured as to interfere with the distal portion 32 of the edge flange 28 escaping from the frame channel 14 in the event the glazing pane 18 is deformed outwardly. As to the structural nature of retainer 42, it is formed of sheet metal or other sufficiently strong and substantially rigid material, and is fixedly attached, optionally removably, to the roll-formed sheet metal or other structural or semi-structural elements of the frame channel. In the preferred embodiment illustrated in FIGS. 1 and 2, retainer 42 is formed of resilient sheet metal which can be pushed into position on the frame channel with a snap fit after the glazing pane 18 is installed. More specifically, edge flange retainer 42 is seen to have a forward end 46 with vertically spaced tabs 48 received into correspondingly positioned slots 50 in the roll-formed sheet metal 36. At the other end, retainer 42 has bent portion 52 snapped over end 54 of the semi-structural weather seal 38. Indent 56 is provided in the retainer to properly position it relative the frame channel and to provide a land or flat for intermittent attachment means, such as a screw, rivet, adhesive, etc., to the roll-formed sheet metal 36.

As noted above, the retainer captures the distal portion 32 of the edge flange 28 in the sense that it is positioned and configured to interfere with the distal portion escaping from the frame channel upon outward deformation of the glazing pane. It can be seen in FIG. 2 that end portion 52 of retainer 42 faces angled end flange or lip 34 of the edge flange 28 and, upon outward deformation of glazing pane 18, would function to lock the edge flange in the frame channel, at least during an initial extent of such outward deformation. It should be noted in this regard that in the preferred embodiment illustrated, the retainer is unnecessary for retaining the glazing pane in the frame channels during normal operation. The edge flange of the glazing pane only contacts and interacts with the retainer in the event of outward deformation of the glazing pane. In that event, the retainer is sufficiently robust and so configured and positioned as to hold the edge flange in the frame channel as plastic or elastomeric outward deformation of the glazing pane acts to absorb energy in a controlled or managed fashion.

The structural elements and operation at rear frame channel 16 correspond to those described above in connection with forward frame channel 14, and to avoid unnecessary redundancy, will not be discussed here in detail. Briefly, it can be seen that frame channel 16 is formed by structural roll-formed sheet metal 58 within which is nested semi-structural weather seal 60. Angled end flange 62 of the distal portion 64 of the edge flange 66 is received into the U-shaped frame channel 16 so formed. It is captured therein by edge flange retainer 68. Thus, upon outward deformation of glazing pane 18, both its forward and rearward vertical edges would be held in their respective frame channel, such that energy would be absorbed by the plastic or elastomeric (referred to here collectively in some instances as non-frangible deformation) deformation of the pane to a substantial extent. As mentioned above, good energy management design considerations may require that edge flange retainers 42 and 68 be so positioned and configured as to eventually release their respective edge flanges once the glazing pane has been deformed past a certain limit.

Figure 3:
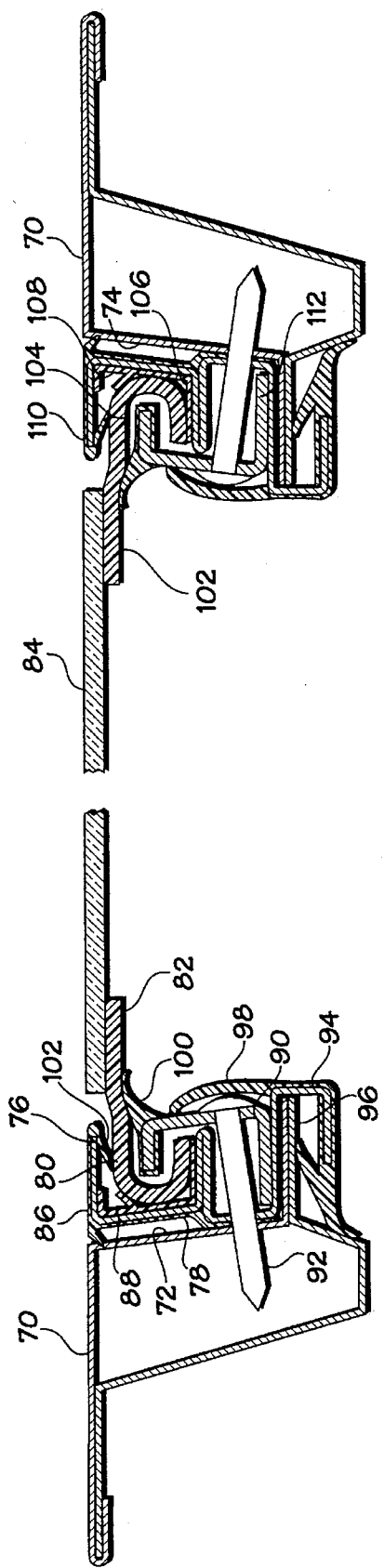
FIG. 3 is a section view, corresponding to the view illustrated in FIG. 2, of an alternative preferred embodiment.

An alternative preferred embodiment is illustrated in FIG. 3, corresponding to the view shown in FIG. 2. In this embodiment the U-shaped frame channels are formed by a stamped door section rather than roll-formed sheet metal. Specifically, sheet metal 70 of a vehicle door is seen to form a rabbit or recess 72 for a first frame channel and a second recess 74 for an opposite frame channel. Vertically extending structural element 76 is seated in recess 72 and further defines forward U-shaped frame channel 78. Distal portion 80 of forward edge flange 82 is received in the frame channel 78. It can be seen that edge flange 82 has a one-sided attachment to a glazing pane 84, such that an excellent flush appearance is achieved, extending from the sheet metal 70 to the outboard surface of glazing panel 84, with the outboard surface 86 of the structural weather seal element 76 also being flush therewith and bridging the gap between them. A run channel 88 is nested within the U-shaped frame channel 78 to provide a smooth, low friction surface for the distal portion 80 of the edge flange 82 to bear against while traveling up and down within the frame channel 78.

An edge flange retainer 90 is attached to the frame channel to capture therein the distal portion 80 of edge flange 82. It can be seen that retainer 90 is substantially U-shaped in that its cross-sectional configuration forms a concavity which receives at least a part of the distal portion 80. Edge flange retainer 90 is fixed in position by screw 92 extending also through structural weather seal member 76 and stamped sheet metal 70. Thus, in addition to capturing the edge flange within the frame channel, the retainer 90 and its attachment means also serves to hold in position the structural weather strip member which defines the U-shaped frame channel in the structure of the vehicle door. Multiple attachment screws 92 would be used in a typical application, being spaced vertically along retainer 90 between the top and bottom of the window opening in the vehicle door.

To provide good weather and noise sealing and/or good visual aesthetics, various sealing flanges are provided in the embodiment illustrated in FIG. 3. Specifically, weather seal member 76 extends laterally at its inboard end 94 to provide a wholly or partially visible decorative surface covering over the underlying portion 96 of sheet metal 70. Flexible sight shield 98 extends outwardly (i.e., upwardly as viewed in the cross-sectional illustration of FIG. 3) from the inboard portion 94 of the weather seal member. Sight shield 98 can be bent or flexed inwardly to facilitate installation and attachment of retainer 90, after which it returns to the position illustrated in FIG. 3, providing an attractive exposed surface and hiding the attachment screws 92. Retainer 90 also carries a sealing flange 100 extending into contact with the edge flange 82. Otherwise, the retainer does not interact with the edge flange during normal up and down travel of glazing pane 84. It will be understood from FIG. 3, taken in light of the foregoing discussion, that retainer 90 would capture the distal portion 80 of edge flange 82 within the frame channel 78 in the event of outward deformation of glazing pane 84. An additional sealing flange 102 extends from the outboard end of weather seal 96 into contact with the outboard surface of edge flange 82. The opposite vertical periphery of glazing pane 84 has one-surface attachment to a second edge flange 102. Distal portion 104 of edge flange 102 is received into rear U-shaped frame channel 106, which is defined by a run channel 108 nested within structural weather seal member 110. A second edge flange retainer 112 captures the distal portion 104 of edge flange 102 within the U-shaped frame channel 106 in accordance with the principles and design features discussed in connection with forward frame channel 78.

Figure 4:
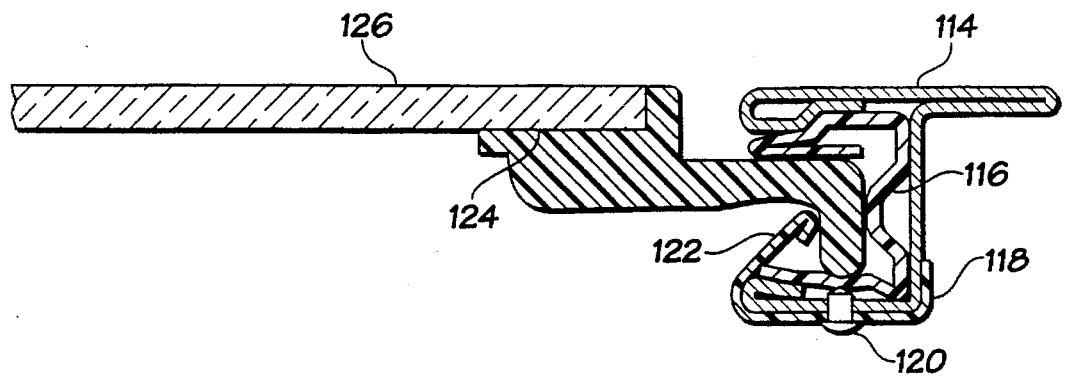
FIG. 4 is a schematic section view, partially broken away and otherwise corresponding to the view of FIG. 2, of a third preferred embodiment.

In the alternative preferred embodiment illustrated in FIG. 4, the frame channel is defined by roll-formed structural sheet metal 114 of the vehicle door and structural or semi-structural weather seal member 116 nested therein. Edge flange retainer 118 is secured to the roll-formed sheet metal 114 by removable screws 120 vertically spaced along the frame channel. The laterally inward end 122 of the retainer (that is, the end of the retainer which is closer to the opposite side of the window opening) is seen to extend into the concavity formed by the distal portion of edge flange 124 attached along the vertical edge of glazing pane 126. In the embodiment of FIG. 4 the weather seal member 116 is substantially hidden from view within the frame channel and does not depend upon the retainer 118 or its fastening means 120 to secure its position therein.

Figure 5:
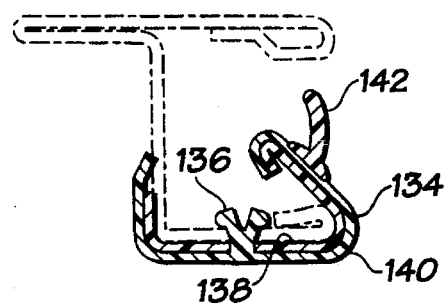
FIG. 5 shows an alternative embodiment of the edge flange retainer suitable for use in alternative embodiments of the motor vehicle glazing units disclosed here.

FIG. 5 illustrates an alternative configuration for edge flange retainers suitable for use in additional preferred embodiments. More specifically, FIG. 5 illustrates a push-on retainer configuration. Retainer 134 has resiliently compressible attachment pins 136 spaced vertically along its inside surface 138. Attachment pins 136 are adapted to be received into slightly smaller holes or slots in a structural element of a frame channel. Outside surface material 140, such as a decorative plastic film, can be adhesively applied or molded thereon, etc. In addition to an aesthetically appealing visual surface, outside material 140 also can be configured to provide a weather or noise seal 142 configured and positioned to have resilient surface-to-surface contact with an adjacent portion of an edge flange.

Figure 6:
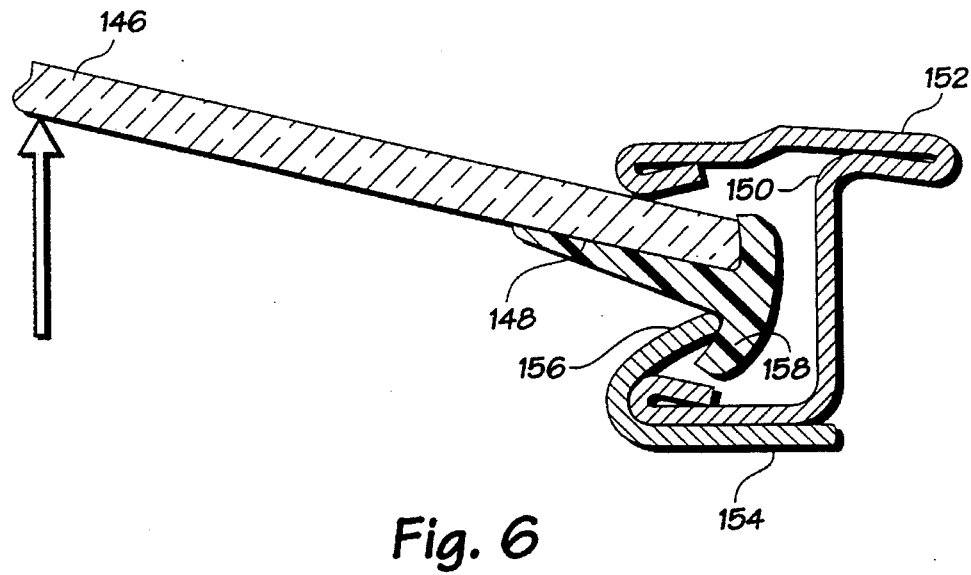
FIG. 6 is a schematic section view, partially broken away and otherwise corresponding to the view of FIG. 2, illustrating an alternative preferred embodiment wherein the edge flange retainer is interacting with the glazing pane edge flange as the glazing pane undergoes outward deformation.

In the embodiment illustrated in FIG. 6, a glazing pane 146 has an edge flange 148 along its vertical edge essentially as in the above described embodiments. U-shaped frame channel 150 is formed by roll-formed sheet metal 152 which is structurally integrated into a motor vehicle door, forming a window opening in which glazing pane 146 travels up and down. An edge flange retainer 154 is adhesively secured to the inboard side of the frame channel and includes an outboard edge 156 which extends into the frame channel. It can be seen that the edge flange retainer is generally U-shaped in that its cross-sectional configuration defines a concavity. In the embodiment illustrated in FIG. 6, the glazing pane 146 is outwardly deformed, such as would occur in the event of sufficient force being applied against its inside surface. Such deformation has caused distal portion 158 of the edge flange 148 to contact and interact with the retainer 154. More specifically, distal portion 158 has entered the aforesaid concavity of the retainer. It will be understood from FIG. 6 that the retainer has thereby captured the distal portion 158 and thus is functioning to retain the glazing pane in the frame channel as it is being outwardly deformed.

Figure 7:
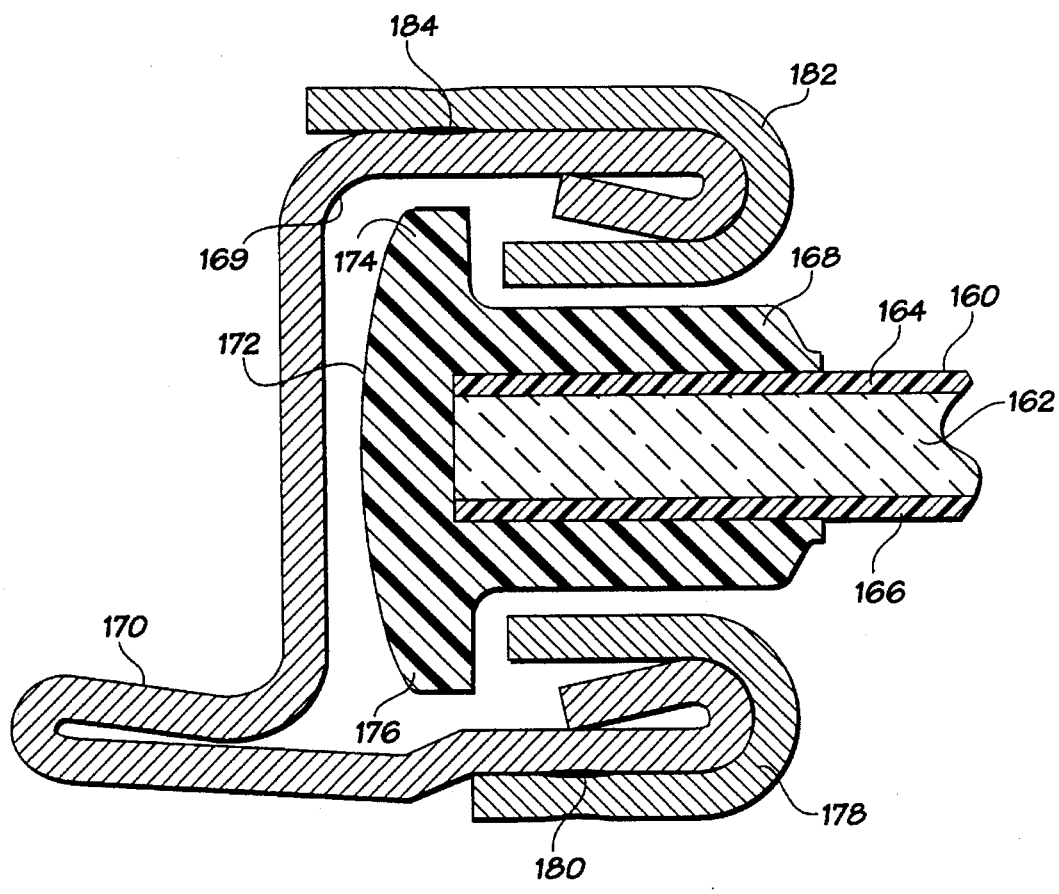
FIG. 7 is a schematic section view, partially broken away and otherwise corresponding to the view of FIG. 2, illustrating an alternative preferred embodiment wherein multiple edge flange retainers are employed to capture the edge flange against both inboard and outboard deformation of the glazing pane.

In the embodiment of FIG. 7 the glazing pane 160 is a trilaminate pane, such as are in present commercial use for motor vehicle windshields. A polyvinyl butyral core 162 is sandwiched between an inboard tempered glass pane 164 and an outboard tempered glass pane 166. The edge flange 168 is seen to have three-sided bonding to the glazing pane, and to be substantially entirely received within a U-shaped frame channel 169 defined by roll-formed sheet metal 170, which is integrated into the structural componentry of a motor vehicle door. The distal portion 172 of the edge flange 168 is seen to be dog-legged in both the inboard and outboard directions. Thus, lip 174 extends in the inboard direction, and lip 176 extends in the outboard direction. Correspondingly, an outboard edge flange retainer 178 is attached to the frame channel by adhesive 180, and an inboard retainer 182 is attached by adhesivet 184. It will be understood from the foregoing discussion of the operating principles and procedures of the glazing units disclosed here, that in the embodiment of FIG. 7 the glazing pane would be retained within the frame channel in the event of inboard and/or outboard glazing pane deformations. Upon outboard deformation, inboard retainer 182 would act on lip 174 of the edge flange to retain the glazing pane in the frame channel. Similarly, upon inboard deformation of the glazing pane, outboard retainer 178 would act on lip 176 of the edge flange.

Figure 8:
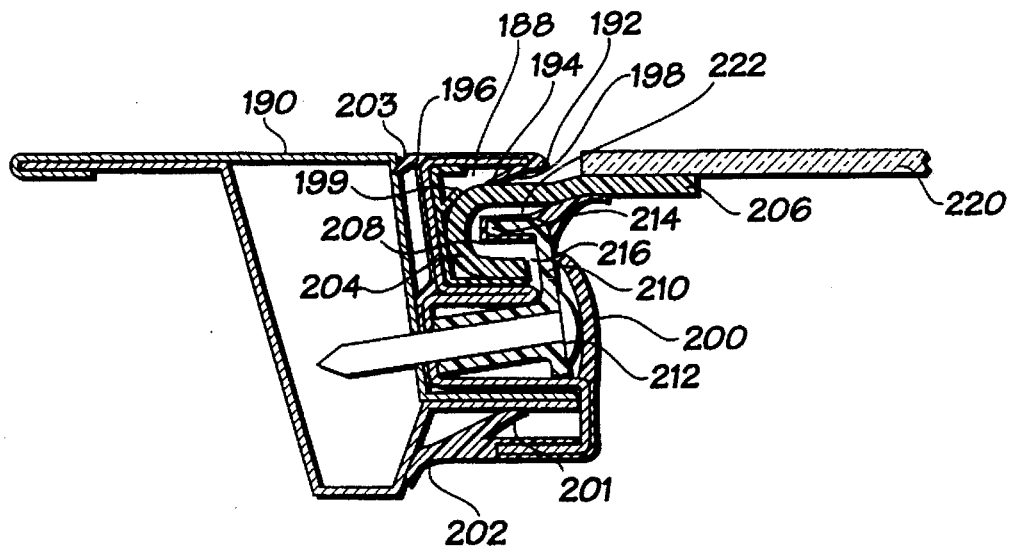
FIG. 8 is a schematic section view, partially broken away and otherwise corresponding to the view of FIG. 2, illustrating another preferred embodiment of the motor vehicle glazing unit.

Another alternative embodiment is illustrated in FIG. 8, comprising a U-shaped frame channel 188 defined by stamped body panel sheet metal 190 and structural or semi-structural weather seal member 192. As in prior embodiments, weather seal member 192 comprises a substantially rigid metal skeleton 194 carrying a plastic or other resilient surface material 196. Weather seal member 192 forms resilient sealing flanges 198–203 in accordance with design principles and functions discussed above in connection with other embodiments. Distal portion 204 of edge flange 206 is received into the frame channel 188, where it is hook-shaped to form a concavity 208. Edge flange retainer 210 is secured in position by attachment screw 212 hidden by resilient sealing flange 200 of the weather seal member 192. Attachment screw 212 also serves to secure the weather seal member in position. It can be seen that an outboard portion 214 of the retainer 210 forms concavity 216 (as viewed in cross-section). The distal portion 204 of the edge flange and the outboard portion 214 of the retainer are so configured and positioned as to interlock with each other in the event glazing pane 220 were deflected outwardly. The opposed concavities of the edge flange and retainer in this and similar embodiments provides excellent windowpane retention. This advantage is achieved in conjunction with the retainer having no adverse impact on the normal operation of the windowpane, that is, opening and closing the window by vertical travel of the glazing pane in an undeformed condition. In fact, no rigid part of the retainer contacts the edge flange during such normal operation of the glazing pane. Resilient seal 222 is seen to extend from the retainer into contact with the edge flange to provide enhanced weather and/or noise sealing properties.

Those who are skilled in this area of technology will recognize that alternative embodiments exist and that modifications and additions can be made to the embodiments discussed above without departing from the true scope and spirit of the invention. All such modifications and additions and alternative embodiments are intended to be covered by the following claims.

I claim:

1. A motor vehicle glazing unit comprising, in combination:

first and second generally U-shaped frame channels open toward each other in substantially fixed position;

a transparent glazing pane moveably mounted in the frame channels, comprising at least a non-frangible pane member and having a peripheral edge;

first and second edge flanges, each affixed along the peripheral edge of the glazing pane and extending laterally beyond the peripheral edge to a distal portion received in the first and second frame channels, respectively; and first and second edge flange retainers in substantially fixed position relative the first and second generally U-shaped frame channels, respectively, each comprising a generally U-shaped structural member capturing the distal portion of the first and second edge flange in the first and second frame channel, respectively.

2. The motor vehicle glazing unit in accordance with claim 1 wherein at least one of the first and second edge flange retainers comprises multiple separate retainer members spaced longitudinally along the corresponding frame channel.

3. The motor vehicle glazing unit in accordance with claim 1 wherein the first and second edge flange retainer each comprises a retainer member at least partially exposed to view during normal use of the motor vehicle.

4. The motor vehicle glazing unit in accordance with claim 1 wherein the edge flange retainer does not contact the corresponding edge flange during normal operation of the glazing unit.

5. The motor vehicle glazing unit in accordance with claim 1 wherein the first and second edge flange retainer each has an interference portion disposed within the frame channel.

6. The motor vehicle glazing unit in accordance with claim 1 wherein the distal portion of the first and second edge flange is U-shaped, being open generally toward each other and disposed in the first and second frame channel, respectively.

7. The motor vehicle glazing unit in accordance with claim 1 further comprising first and second auxiliary edge flange retainers in substantially fixed position relative the first and second generally U-shaped frame channels, respectively, each comprising a structural member capturing the distal portion of the first and second edge flange in the first and second frame channel, respectively, against inward deformation of the glazing pane.

8. The motor vehicle glazing unit in accordance with claim 1 wherein at least one of the edge flange retainers further comprises a weather seal member integral with the generally U-shaped structural member.

9. The motor vehicle glazing unit in accordance with claim 1 wherein the first and second edge flange each is a unitary molded member extending longitudinally along a first and second vertical periphery, respectively, of the glazing pane.

10. The method of assembling a motor vehicle glazing unit comprising, in combination, the steps of:

providing a motor vehicle body structure having a window opening defined in part by first and second generally U-shaped frame channels open toward each other in substantially fixed position;

moveably mounting a transparent glazing pane into the window opening, wherein the glazing pane comprises at least a non-frangible pane member having a peripheral edge, with first and second edge flanges affixed along first and second portions, respectively, of the peripheral edge of the glazing pane and extending laterally beyond the peripheral edge of the glazing pane to a distal portion received in the first and second frame channels, respectively; and then assembling first and second edge flange retainers in substantially fixed position relative the first and second frame channels, respectively, to capture the distal portion of the first and second edge flange in the first and second frame channel, respectively.

11. The method of assembling a motor vehicle glazing unit in accordance with claim 10, wherein each said edge flange retainer comprises a generally U-shaped structural member open away from each other in its installed position.

* * * * *